United States Patent [19]

Mouranie

[11] 3,978,881
[45] Sept. 7, 1976

[54] GAS LINE PIERCE VALVE

[75] Inventor: Edward M. Mouranie, Southfield, Mich.

[73] Assignee: The Westward Company, Troy, Mich.

[22] Filed: June 5, 1975

[21] Appl. No.: 584,055

[52] U.S. Cl. ............................. 137/318; 285/197
[51] Int. Cl.² ........................................ F16K 43/00
[58] Field of Search ............. 137/317, 318; 138/94; 285/12, 197

[56] References Cited
UNITED STATES PATENTS

| | | | |
|---|---|---|---|
| 2,875,777 | 3/1959 | Lacart | 137/318 |
| 3,038,490 | 6/1962 | Yocum | 137/318 |
| 3,115,889 | 12/1963 | Franck et al. | 137/318 |
| 3,198,206 | 8/1965 | O'Brien | 137/318 |
| 3,252,474 | 5/1966 | Ehrens et al. | 137/318 |
| 3,252,475 | 5/1966 | Jones | 137/318 |
| 3,509,905 | 5/1970 | Mullins | 137/318 |
| 3,543,788 | 12/1970 | Mullins | 137/318 |
| 3,648,725 | 3/1972 | Strybel | 137/318 |
| 3,661,169 | 5/1972 | Mullins | 137/318 |

*Primary Examiner*—Alan Cohan
*Assistant Examiner*—G. L. Walton
*Attorney, Agent, or Firm*—Whittemore, Hulbert & Belknap

[57] ABSTRACT

The invention provides a valve assembly for use on a refrigerating pipe line to gain access to the refrigerant so that it can be removed or replaced without disassembly of the piping while repairs are being made. The assembly is a compact structure comprising a single integral body member having a stem within which is a movable pierce valve and having a transverse threaded nipple forming an internal fluid passageway controlled by the adjustment of said movable pierce valve. The valve is in non-removably position within said body and is sealed to said body by an O-ring placed in an undercut on the stem of said valve. Interchangeable clamp plates secure the pipe line to the body adjacent the point of the pierce valve. Each of two interchangeable plates has two sets of grooves so that four sizes of tubes can be accommodated by interchanging and adjusting the two clamp plates. The construction is simple but reliable and an improvement over all known prior art.

10 Claims, 13 Drawing Figures

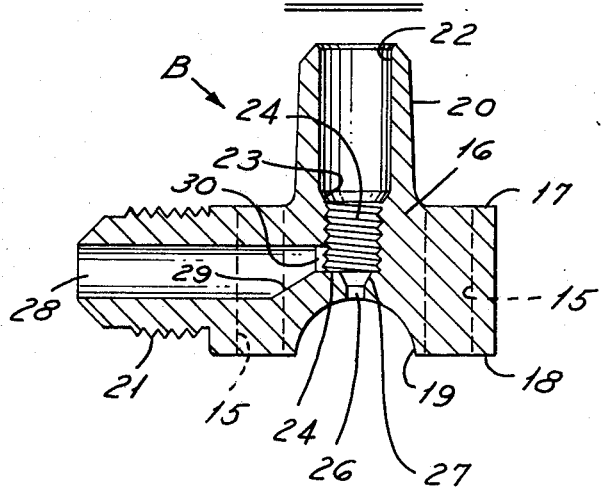
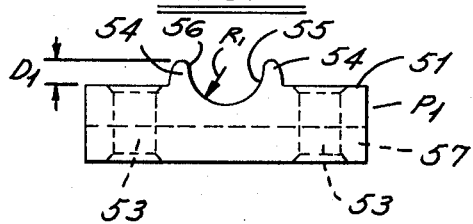
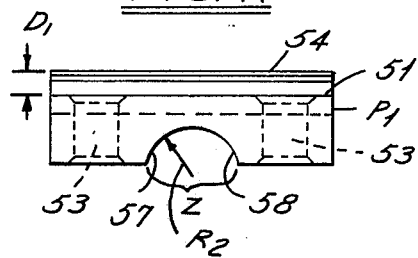
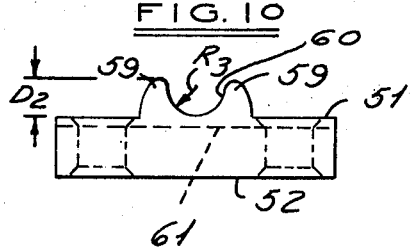
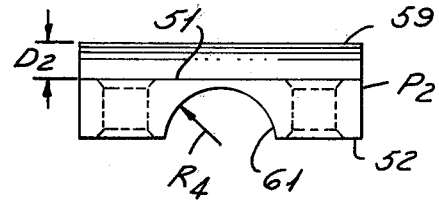
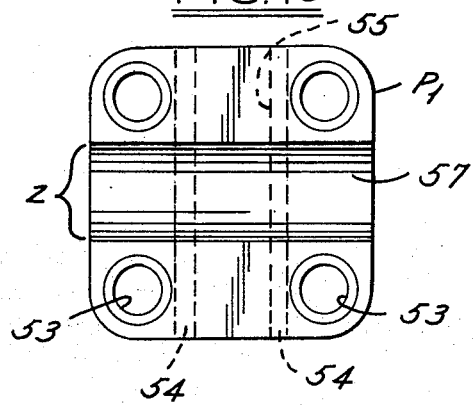

GAS LINE PIERCE VALVE

BACKGROUND OF THE INVENTION

The invention relates to valves for use on a refrigerating pipe line to provide access to the refrigerant so that it can be removed or replaced without mechanical disassembly of the refrigerant pipes or lines while repairs are being made.

FIELD OF THE INVENTION

The field of the invention is in connection with fractional horsepower refrigerating units (refrigerators, freezers, air conditioners, etc.). When the refrigerating apparatus develops trouble and requires servicing, it may be necessary to remove or replace the refrigerant to complete the repairs. Accordingly, it has long been appreciated that a valve unit is needed which can readily be clamped to a pipe line, which unit must have a piercing point which can be forced to pierce the line. The present invention resembles the developed art in this broad objective but provides a construction which is a great improvement over the various devices that have heretofore been used for such purposes.

DESCRIPTION OF THE PRIOR ART

A search of the prior art has revealed the following patents in the general field of the present invention:

| | |
|---|---|
| 1,423,966 - Palmaffy | 3,385,321 - Ehrens |
| 2,608,989 - McDonald | 3,428,075 - Wagner |
| 2,660,192 - Hunter | 3,450,149 - Brinda |
| 2,794,352 - Mueller | 3,456,675 - Ehrens |
| 2,827,913 - Wagner | 3,480,036 - Ehrens |
| 2,875,777 - LaCart | 3,490,473 - Ehrens |
| 3,039,490 - Yocum | 3,495,615 - Ehrens |
| 3,045,511 - Risley | 3,554,217 - Ehrens |
| 3,115,889 - Franck | 3,556,470 - Ehrens |
| 3,252,474 - Ehrens | 3,580,269 - Ehrens |
| 3,336,937 - Ehrens | 3,661,169 - Mullins |

| French Patents | British Patents | Italian Patent |
|---|---|---|
| 964,354 | 505,046 | 505,675 |
| 1,153,375 | 726,795 | |

Of the patents listed, U.S. Pat. No. 3,252,474 dated May 24, 1966 discloses a line tap valve somewhat similar in general construction and operation, but the present invention does not utilize any of the claimed inventive features of that patent and moreover, is a vast improvement over everything in the disclosure of said patents.

SUMMARY OF THE INVENTION

The gas line pierce valve of the present invention is a compact structure composed of a small number of parts that are so designed as to provide a valve assembly that can be used for servicing all popular refrigeration tube sizes with only one additional interchangeable part. This is accomplished by making the main body of a single integral member to which is interchangeably attached one or the other of two clamping plates. The parts are joined together by four corner cap screws. The movable pierce valve is non-removably contained within the body. The only additional parts are a sealing cap threaded on a nipple protruding from the main body, a gasket between the body and the refrigerating tube and an O-ring on a stem of the pierce valve which at all times forms a seal between the axially adjustable pierce valve and the cylindrical inner wall of the body member.

The objectives of the invention and the advantageous results obtained will be more fully set forth after describing a preferred embodiment.

BRIEF DESCRIPTION OF THE DRAWINGS

FIG. 8 is a sectional view similar to FIG. 3 of the body member.

FIG. 9 is a similar sectional view of one of the clamping plates.

FIG. 10 is a similar view of a second form of clamping plate.

FIG. 11 is a transverse view of the plate of FIG. 9.

FIG. 12 is a transverse view of the plate of FIG. 10.

FIG. 13 is a bottom view of the plate of FIGS. 9 and 11.

DESCRIPTION OF THE PREFERRED EMBODIMENT

The valve assembly A of this invention is applied to a tube or line L through which a refrigerant or other fluid passes. The assembly A is of simple construction consisting of only a few separate parts. It comprises a main body B secured to the line L by a clamping plate P which is fastened to the body by four retainer screws S. The assembly also includes a seal cap C, a puncturing valve V and three sealing devices.

Figure 3:
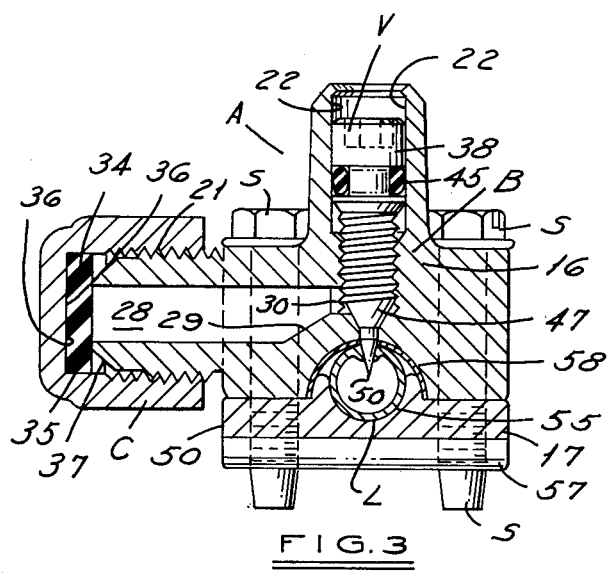
FIG. 3 is a section on line 3—3 of FIG. 1 showing the pierce valve after puncturing the tube and sealed in the body.
Figure 4:
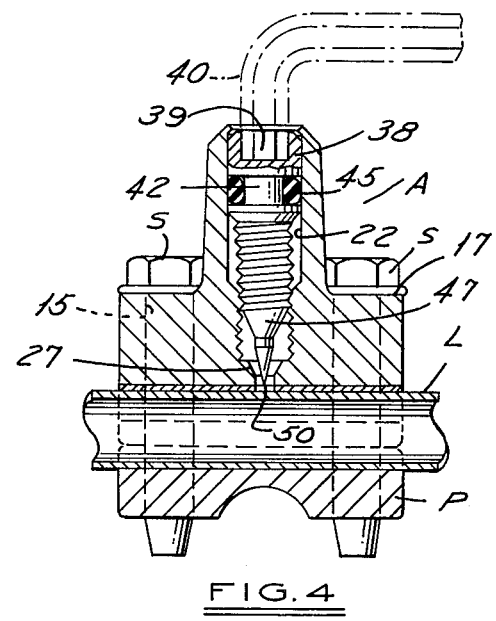
FIG. 4 is a transverse section on line 4—4 of FIG. 1 showing the valve before puncturing and also showing the actuating wrench.
Figure 5:
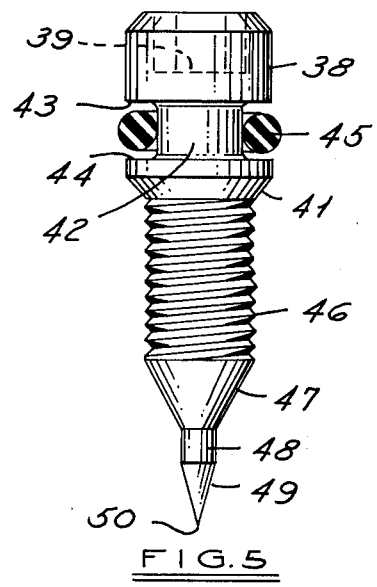
FIG. 5 is a greatly enlarged view of the puncturing needle valve.
Figure 6:
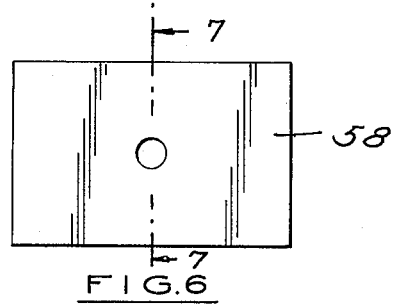
FIG. 6 is a greatly enlarged plan view of the sheet stock used as a gasket.
Figure 7:
FIG. 7 is a section on line 7—7 of FIG. 6 but on the smaller scale of FIGS. 1 to 4 inclusive.

The body B, shown separately in FIG. 8 and assembled in FIG. 3, consists of a square central block 16, with a flat top surface 17 and a parallel bottom surface 18 with a rounded groove 19 for fitting over the pipe line. At the four corners of the square block are bores 15 for receiving the fastening screws. A stem 20 extends upwardly from the top of the block and a threaded nipple 21 extends laterally from one of the four sides of the square block. The longitudinal axis of the nipple is at right angles to both the longitudinal axis of the stem 20 and the lengthwise dimension of the rounded groove 19.

The body B has two bores therein at right angles to each other which intersect within the center of the block to form a single continuous fluid passageway. One bore extends upwardly through the stem 20 and is bounded by a cylindrical wall 22 of constant diameter throughout the length of the stem 20 with its inner bevelled end 23 at about the level of the top surface 17. Below the bevel is a hole of smaller diameter formed with internal threads 24 extending to about the center of the body. At the bottom 25 of the threaded portion, there is a smaller hole 26 intersecting with the rounded groove 19. A conical seat 27 is provided just above the small hole 26. The other bore consists of a cylindrical hole 28 extending from the outer end of the nipple into the center of the body terminating in a bevelled surface 29. A small hole 30 with its axis above the axis of bore 28 intersects with the internally threaded portion 24 just above the conical seat 27.

The cap C has a hexagonal outer surface 31 with internal threads 32 adapted to engage the external threads 33 on nipple 21. Inside the cap is a circular gasket 34 fitted within the inside cylindrical wall 35 abutting the end wall 36. The circular gasket 34 is die cut from suitable material which will stand up under use. A preferred material is chloroprene with a durometer 75±5 "A;" tensile 1000 lbs. per square inch and minimum compression set 20% at 100° C for 70 hours. The circular gasket has flat sides to engage the end wall 36 of the cap and the bevelled end 37 of the nipple.

The puncturing valve V is made of a single piece of metal. The head end 38 is cylindrical of a diameter to fit within the cylindrical wall 22 of the stem 20 and of a substantial length. At the top end there is a polygonal socket 39 for receiving the correspondingly shaped end of a removable wrench 40. At the bottom of the head 38 there is a bevel 41 and intermediate the ends of the head there is a circular groove forming a stem 42 of smaller diameter between the two shoulders 43 and 44. The groove is for the purpose of receiving and retaining the O-ring 45 which forms a seal with the inner wall of bore 28. Below the bevel 41, the valve V is of reduced diameter and externally threaded at 46 to engage the internal threads 24 of the body B. At the lower end of the threaded portion 46 is a conical surface 47 of a size to engage the conical seat 27. At the bottom of the conical surface 47 the valve V has first a cylindrical surface 48 and then a pointed conical portion 49 terminating in a puncturing point 50.

While the exact dimensions of the valve V are not necessarily critical, yet it is important that they be selected to give desirable results. Hence the following optimum values are set forth. The pointed conical portion 49 has an angle of 15° while conical surface 47 has an angle of 30°. The diameter of the cylindrical surface 48 is between 0.06 and 0.07. The distance from point 50 to the intersection of 48 and 47 is 0.16 and from point 50 to the intersection of 46 and 41 is 0.53 and the overall length from point 50 to the top of head 38 is 0.85. The length of the groove 42 between shoulders 43 and 44 is 0.0875. The diameter of head 38 is 0.250 and the O.D. of threads 46 is 0.186. All dimensions are in inches.

The valve of this invention is designed to fit various sizes of line tubes without requiring a large number of spare parts. For this purpose, the radius of the groove 19 in body B is large enough to accommodate the largest selected of the tube sizes and the adjustment for the smaller sizes is made by the design of the grooves in the cooperating clamping plate P. FIGS. 9 and 11 show a clamping plate designed for the more common refrigeration tubes of median size; namely, ¼ and 5/16 tubes. FIGS. 10 and 12 show a clamping plate for sizes 3/16 and ⅜. FIG. 13 is the interpretive view for the plate of FIGS. 9 and 11.

Figure 1:
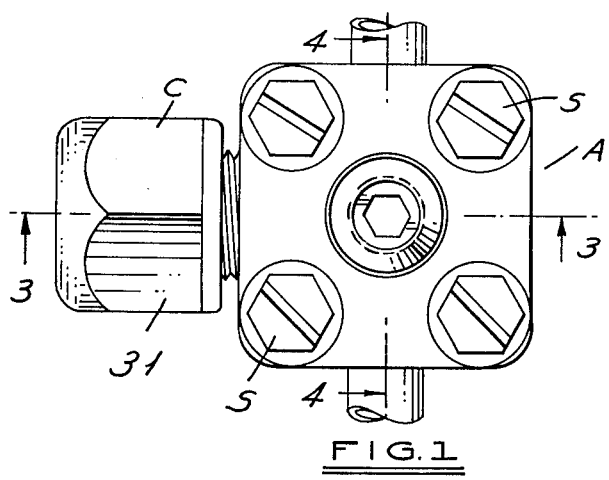
FIG. 1 is a plan view of the valve assembly on a scale larger than the actual device.
Figure 2:
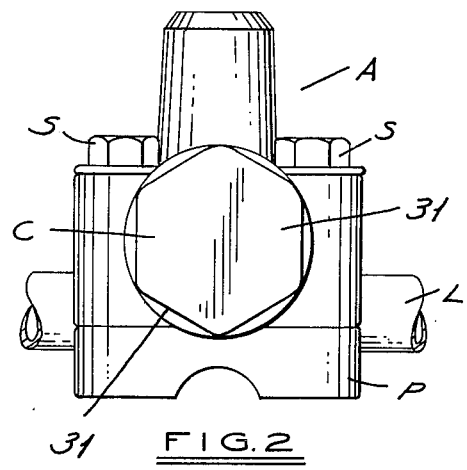
FIG. 2 is a side view thereof mounted on a pipe line.

Referring now to FIGS. 9, 11 and 13, the clamping plate $P_1$ shown therein is formed from a metal block with parallel top and bottom faces 51 and 52 respectively, and threaded apertures 53 at the four corners for receiving the fastening screws S which project downwardly through the corner apertures 15 in body B. Between these threaded apertures on the top face 51 are two parallel upwardly projecting ridges 54 forming between them a rounded groove 55 the inner surface 56 of which is semi-circular in cross-section with a radius $R_1$. The height of the ridges 54 above the face 51 is a distance $D_1$. On the bottom face is a rounded groove 57 projecting upwardly within the block above the bottom edge 52. The groove 57 extends between threaded apertures 53 in a direction at right angles to groove 55 and in cross-section is a semi-circle of radius $R_2$. The surface 58 of groove 57 is semi-cylindrical. When the upper face 51 of the clamping plate $P_1$ is placed adjacent lower face 18 of body B, the ridges 54 project into groove 19 as illustrated in FIG. 1, which Figure also shows the appropriate size tube L and the gasket 62 in the positions they occupy after the valve V has pierced the tube.

When the device is used on the next larger size tube, the plate $P_1$ is reversed so that its face 52 is adjacent face 18 of the body. In this alternate position the groove 57 without any accompanying ridges forms the lower clamp. In the preferred embodiment the first position of plate $P_1$ as illustrated in FIG. 3 is used for clamping a ¼ inch tube and radius $R_1$ is selected to conform with the O.D. of a ¼ inch tube. In the alternate position of plate $P_1$ the radius $R_2$ is selected to conform to the O.D. of the next larger size; namely, a 5/16 inch tube.

FIGS. 10 and 12 illustrate an exchange plate $P_2$ similar to plate $P_1$ except that it is designed for tube sizes next smaller and next larger than those which fit $P_1$. Thus as shown in FIG. 10 ridges 59 project further above top surface 51 for a distance $D_2$ and the groove 60 between these ridges has a radius $R_3$ corresponding to a 3/16 inch tube. On the lower face 52 the groove 61 has a radius $R_4$ appropriate for a ⅜ inch tube.

With the specific embodiment of the invention as so far described the following advantages over the prior art are attained:

The body is a one-piece construction utilizing no auxiliary seal retainer, the bore is smooth at the upper end of the vertical stem and tapped at a lower level for actuating the piercing screw. Below the thread is a smooth conical seat which when engaged with the piercing screw forms a shut off, preventing any gas leakage through the threaded side port.

This side port permits the attachment of a flared tube for charging the system from an external gas supply. The semi-circular cutout at the lower end of the body, when fitted with the gasket, totally encircles the soft metal tube and reshapes it to its true circular form preparatory to piercing. The four holes through the body provide equal clamping pressure on the tube but without excessive pressure that may cause the collapse of the tube. The clamping pressure is controllable and adequate to prevent slippage.

Upon assembly of the piercing screw and seal into the stem, the top of the stem is deformed inwardly at 22A toward the center of the screw. By this method the screw cannot be retracted from the stem, causing an accidental leakage of refrigerant, subsequently damaging the compressor beyond repair.

The piercing screw is a special element with a long tapered point for piercing soft metallic tubing. It does not truly pierce but instead extrudes the metal toward the center of the tube until it fractures, forming a shaped, smooth port through the tube wall without loose chips falling into the system. An undercut is formed in the smooth, round head of the screw to receive the elastomeric seal ("O" Ring).

The position of the undercut retains the seal in intimate contact, at all times, within the smooth bore of the body stem. The staking of the body stem after assembly of the valve further insures the travel limits of the screw as outlined above.

The clamp plates are unique in that each plate will accept two sizes of tubing and when used with smaller diameter tubes, are provided with encircling ribs to support the tube beyond its center line.

These supporting ribs prevent lateral deformation while piercing and at the same time straightens the tube for the full length of engagement. The four tapped holes permit the clamping screws to be tightened from the accessible side of the valve with less pressure per fastener than other valves and less susceptible to loosening caused by vibration.

The gasket is made of an elastomeric impregnated cloth. The fabric insert restrains the flow of the elastomer under pressure thus insuring a seal for the full length of the gasket. The elastomer is a synthetic rubber which will not degrade in the environment of the sealed gases.

The seal cap and gasket are used as a secondary seal to seal the inlet ports after charging and to insure against leakage after completion of the repair.

What I claim as my invention is:

1. A valve structure for a refrigerating pipe line comprising a body having a pipe receiving groove on a face thereof, a clamp plate having a face fitting against said body face having a complementary pipe receiving groove, means for clamping said faces together thereby embracing said pipe line in said grooves and securing said valve structure on said pipe line, a stem integral with and projecting from body having an unthreaded cylindrical bore therein with its axis transverse to the axis of said body groove, a nipple projecting from said body having a bore with its axis transverse to and intersecting with the stem bore within said body forming a continuous fluid passageway, said body provided with internal threads in said continuous passageway between said transverse nipple bore and said unthreaded cylindrical stem bore and located in the main portion of the part of said body from which said integral stem projects, a screw valve axially movable within the bore of said stem, said screw valve having a pierce point at the inner end which can be moved through an aperture through the body between said fluid passageway and said body groove, said valve having a conical valve surface adjacent said pierce point for engaging a valve seat surrounding said aperture, said valve having external threads extending outwardly from said valve surface and engaging said internal threads within said body, an enlarged head at the outer end of said valve and entirely within said cylindrical bore of said stem, said head being provided with a circumferential groove, and an O-ring in said circumferential groove of a size to fit within said cylindrical stem bore while squeezed between the end shoulders of said groove thereby forming a seal with said cylindrical bore of said projecting stem during axial adjustment of said screw valve.

2. A valve structure according to claim 1 in which said stem has an axially length to overlap the outer end of said head when said valve is retracted with its pierce point above the surface of said body groove, and means is provided to prevent further outward axial retraction of said screw valve, after initial insertion within said stem.

3. A valve structure according to claim 2 in which the means to prevent retraction of the valve consists of an inturned flange deformed after the screw valve is within the stem.

4. A valve structure according to claim 1 in which said body is an integral one-piece construction from the stem to said grooved face fitting against said clamping plate, and said valve is a separate member wholly within the boundaries of said integral body.

5. A valve structure according to claim 1 in which said clamp plate has on a face fitting against said body, a pair of upwardly projecting ridges forming between them a rounded semi-circular groove, the radius of said groove being smaller than the radius of said body groove and said ridges extending for a substantial distance into said body groove to thereby rigidly clamp between said body and said plate a tube of the size of the groove between said ridges.

6. A valve structure for a refrigerating pipe line comprising a body having a pipe receiving groove on a face thereof, a clamp plate having a face fitting against said body face having a complementary pipe receiving groove, means for clamping said faces together thereby embracing said pipe line in said grooves and securing said valve structure on said pipe line, a stem projecting from said body having a bore therein with its axis transverse to the axis of said body groove, a nipple projecting from said body having a bore with its axis transverse to and intersecting with the stem bore within said body forming a continuous fluid passageway, a screw valve axially movable within the bore of said stem, said screw valve having a pierce point at the inner end which can be moved through an aperture through the body between said fluid passageway and said body groove, said valve having a conical valve surface adjacent said pierce point for engaging a valve seat surrounding said aperture, said valve having external threads extending outwardly from said valve surface and engaging internal threads within said body, an enlarged head at the outer end of said valve with a circumferential groove, an O-ring in said circumferential groove of a size to fit within said bore while squeezed between the end shoulders of said groove thereby forming a seal with said body during axial adjustment of said screw valve in which said clamp plate has on a face fitting against said body, a pair of upwardly projecting ridges forming between them a rounded semi-circular groove, the radius of said groove being smaller than the radius of said body groove and said ridges extending for a substantial distance into said body groove to thereby rigidly clamp between said body and said plate a tube of the size of the groove between said ridges in which said clamp plate has two parallel flat faces, one of said faces having the aforesaid ridges and the opposite face being free from ridges but having a groove with its axis at right angles to the axis of the groove formed by said ridges, whereby said clamping plate may be used for securing two different size tubes by alternately clamping the one or the other face of the plate to said body.

7. A valve structure according to claim 6 in which are provided two separate clamping plates each having its opposite faces constructed as defined, one of said two plates having its ridges of a size to embrace a one-quarter inch tube and the opposite face free from ridges with a groove radius to embrace a five-sixteen inch tube and the second of said two plates having its ridges of less radius and greater height than said first plate to embrace a three-sixteenths inch tube and the opposite side of said second plate being free from ridges with a groove radius greater than said first plate to embrace a three-eighths inch tube, whereby the same valve body can be used with four sizes of tubes with only two alternately assembled parts for a single body member.

8. A valve structure according to claim 1 in which a flat piece of gasket material is adhesively secured to said body groove, four cap screws extend parallel to said valve through the four corners of said body into threaded apertures in the four corners of said clamping plate, a cap threadedly engages said nipple, a gasket is arranged within said cap to seal against the outer end of said nipple and said valve has the following configuration, a piston-like head at one end, a recess in the end of said head forming a wrench hold for an Allen wrench, a circumferential groove in said head adjacent said recess, a shoulder at the recess end of said groove, a narrow shoulder at the opposite end of said groove, a stem of smaller diameter than said head immediately adjacent said shoulder, external threads on said stem extending for the full length thereof, a conical valve surface immediately adjacent said threads, a short cylindrical surface at the small end of said conical surface, and a long narrow small angled cone from said cylindrical surface to a puncture point end, the aforesaid valve being axially adjustable within said body and stem from a retracted position with said point above said body groove and the upper end within the stem to a valve seating position with said point through the punctured wall of the line tube and said conical valve surface in firm engagement with the conical seat in said body.

9. A valve structure for a refrigerating pipe line comprising a body having a pipe receiving groove on a face thereof, a clamp plate having a face fitting against said body face having a complementary pipe receiving groove, means for clamping said faces together thereby embracing said pipe line in said grooves and securing said valve structure on said pipe line, a stem projecting from said body having a bore therein with its axis transverse to the axis of said body groove, a nipple projecting from said body having a bore with its axis transverse to and intersecting with the stem bore within said body forming a continuous fluid passageway, a screw valve axially movable within the bore of said stem, said screw valve having a pierce point at the inner end which can be moved through an aperture through the body between said fluid passageway and said body groove, said valve having a conical valve surface adjacent said pierce point for engaging a valve seat surrounding said aperture, said valve having external threads extending outwardly from said valve surface and engaging internal threads within said body, an enlarged head at the outer end of said valve with a circumferential groove, and an O-ring in said circumferential groove of a size to fit within said bore while squeezed between the end shoulders of said groove thereby forming a seal with said body during axial adjustment of said screw valve in which said clamp plate has on a face fitting against said body, a pair of upwardly projecting ridges forming between them a rounded semi-circular groove, the radius of which is smaller than the radius of said body groove and said ridges extending into said body groove and said clamp plate has a second face parallel to said first face having a groove therein at right angles to the groove on said first face, said second face being free from ridges, said two faces being alternatively clamped to said body by said cap screws whereby two different size tubes may be secured to the valve structure.

10. A valve structure according to claim 9 in which there are two separate clamping plates each having its opposite faces as aforesaid, but differing in height of ridges and curvature of grooves thereby permitting the same body to be clamped on four different sizes of tubes with only two alternatively assembled clamping plates.

* * * * *